May 4, 1926.  
V. J. M. PROCOPIO  
1,583,745
SAFETY ATTACHMENT FOR AIRPLANES
Filed Nov. 25, 1925
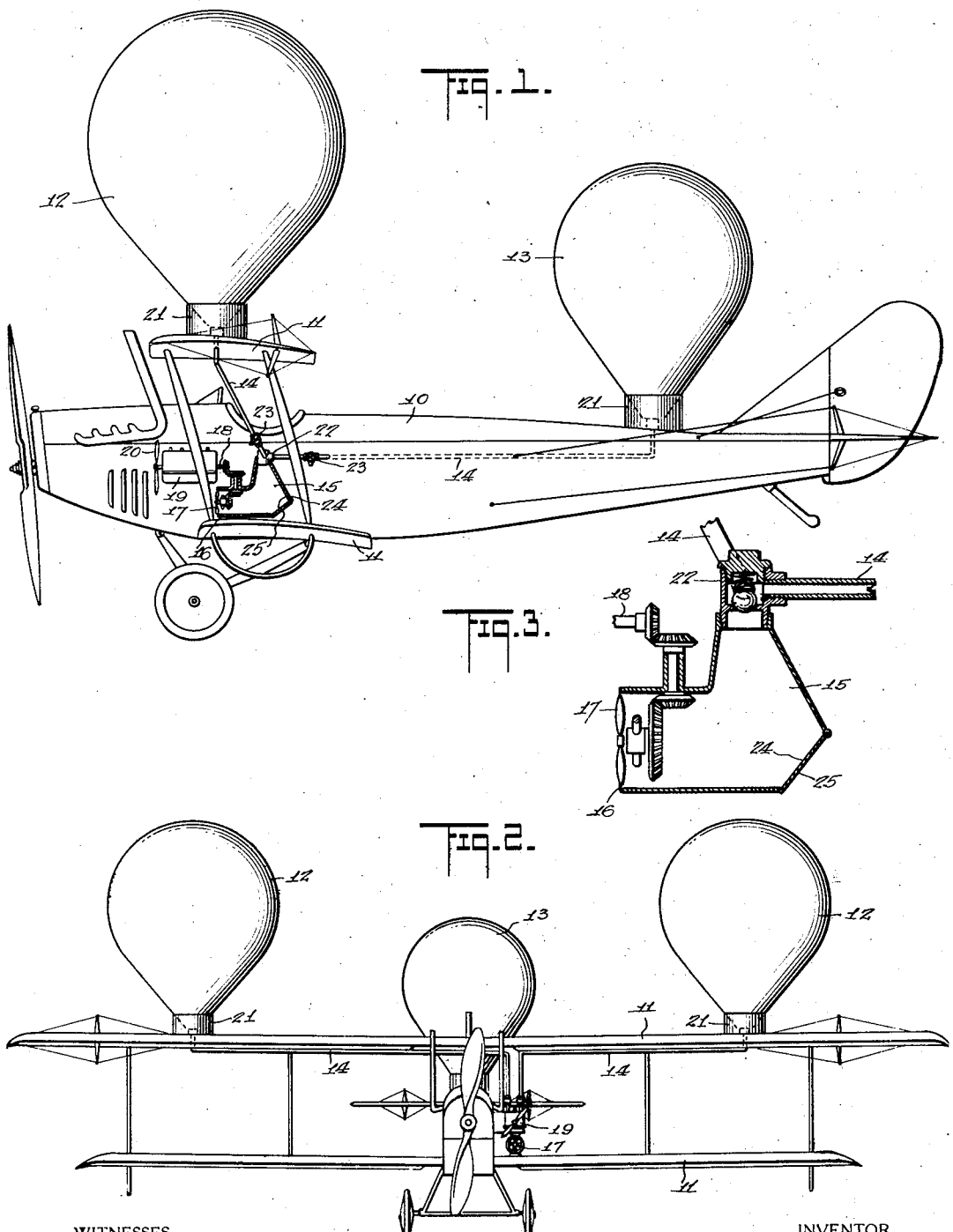
WITNESSES
INVENTOR  
Vincent J. M. Procopio,  
BY  
ATTORNEYS Patented May 4, 1926.

1,583,745

UNITED STATES PATENT OFFICE.

VINCENT J. M. PROCOPIO, OF NEW YORK, N. Y.

SAFETY ATTACHMENT FOR AIRPLANES.

Application filed November 25, 1925. Serial No. 71,307.

*To all whom it may concern:*

Be it known that I, VINCENT J. M. PROCOPIO, a citizen of the United States of America, and a resident of the city of New York, borough of Manhattan, in the county and State of New York, have invented a new and Improved Safety Attachment for Airplanes, of which the following is a full, clear, and exact description.

This invention relates to aircraft and has particular reference to a safety device as an attachment for airplanes.

Primarily the invention comprehends a safety device constituting normally inactive means adapted in event of an emergency, to be rendered active for the purpose of materially increasing the displacement of an airplane body so as to greatly retard its descent, and to prevent serious damage both to the airplane and to the occupants.

More specifically the invention contemplates a safety device as an attachment for airplanes, which consists of normally deflated inflatable bags together with means operable independently of the motive power of the airplane for inflating the bags in event of an emergency where the main motor fails or in event the pilot loses control of the airplane.

The invention furthermore embodies a safety device as an attachment for airplanes, which is comparatively simple and light in its structure, inexpensive to install and highly efficient in its purpose.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a side view of an airplane equipped with a safety device constructed in accordance with the invention illustrating the same in active use;

Fig. 2 is a front view thereof;

Fig. 3 is an enlarged detail sectional view of the inflating means.

Referring to the drawigns by characters of reference, 10 designates the body or fuselage of an airplane and 11 the air foils or wings.

The safety device constituting the present invention includes a pair of inflatable bags 12 mounted on the upper surface of the upper air foil or wing 11 adjacent the opposite ends thereof and an inflatable bag 13 mounted on the upper surface of the fuselage or body 10 adjacent the tail. The bags are connected by means of conduit pipes 14 to a casing 15 having an intake opening 16 preferably at the forward end thereof within which a suction fan 17 is mounted. The suction fan is operatively connected with the drive shaft 18 of a motor 19, which motor is independent of the motor for driving the propeller of the airplane. The motor shaft 18 has secured to its forward end a propeller 20 for a purpose to be hereinafter set forth. Each of the inflatable bags 12 and 13 is adapted when deflated under normal conditions, to be nested within a receptacle or container 21, therefor, which containers are mounted, respectively, on the wing and fuselage adjacent the point of securement of the bags thereto.

The conduit pipes 14 connect with the casing through a check valve 22 which allows for the passage of air therethrough in a direction to inflate the bags but prevents retrograde movement or exhaust of the air. The conduit pipes 14 are each provided with an exhaust valve 23 to permit of the deflation of the bags when desired.

The casing 15 is further provided with a normally closed outlet 24 having a closure 25.

In use and operation the bags 12 and 13 are normally deflated and nested within the receptacles or containers 21 and the motor 19 is inactive. In event of failure of the main motor to operate or the pilot loses control of the airplane, the small auxiliary motor 19 is thrown into operation, thereby simultaneously driving the auxiliary propeller and the suction fan 17. This effects the inflation of the bags 12 and 13 to materially increase the displacement of the airplane body to arrest the descent of the same, and to cause the airplane to assume a normal horizontal position. At the same time, the propeller 20 and the suction fan 17 operate in the capacity of a propulsion means to permit the pilot to gain control of the machine. When the bags are sufficiently inflated, the closure 25 is opened so as to allow free passage of the air through the casing 15.

From the foregoing it will be seen that a safety device as an attachment for airplanes, has been devised, which is comparatively simple in its construction and mode of operation.

What is claimed is:

1. A safety device attachment for airplanes, comprising inflatable elements mounted on the wings and fuselage of the airplane, receptacles at the point of connection of the inflatable elements with the airplane for receiving and completely covering the elements when deflated, a casing, conduits leading from the casing to the inflatable elements, check valves in the conduits, an air inlet in the casing, means in the inlet for drawing in and compressing air in the casing to supply through the conduits compressed air to the inflatable elements for inflating the same, an auxiliary motor independent of the main motor of the airplane for driving said means, and an auxiliary propeller on the motor shaft constituting a propulsion means when the main propulsion means is out of operation.

2. A safety device attachment for airplanes, comprising inflatable elements mounted on the wings and fuselage of the airplane, receptacles at the point of connection of the inflatable elements with the airplane for receiving and completely covering the elements when deflated, a casing, conduits leading from the casing to the inflatable elements, check valves in the conduits, an air inlet in the casing, means in the inlet for drawing in and compressing air in the casing to supply through the conduits compressed air to the inflatable elements for inflating the same, an auxiliary motor independent of the main motor of the airplane for driving said means, and an auxiliary propeller on the motor shaft constituting a propulsion means when the main propulsion means is out of operation, said casing having a normally closed outlet adapted to be opened when the inflatable elements are sufficiently inflated.

3. A safety device attachment for airplanes, comprising inflatable elements mounted on the wings and fuselage of the airplane, receptacles at the point of connection of the inflatable elements with the airplane for receiving and completely covering the elements when deflated, a casing, conduits leading from the casing to the inflatable elements, check valves in the conduits, an air inlet in the casing, means in the inlet for drawing in and compressing air in the casing to supply through the conduits compresed air to the inflatable elements for inflating the same, an auxiliary motor independent of the main motor of the airplane for driving said means, an auxiliary propeller on the motor shaft constituting a propulsion means when the main propulsion means is out of operation, said casing having a normally closed outlet adapted to be opened when the inflatable elements are sufficiently inflated, and means for opening the check valves to deflate the inflatable elements.

VINCENT J. M. PROCOPIO.